US012756422B2

(12) United States Patent
Styles et al.

(10) Patent No.: US 12,756,422 B2
(45) Date of Patent: Oct. 6, 2026

(54) MEASUREMENT DEVICE AND A MEASUREMENT INTERFACE HAVING A RADIO COMMUNICATIONS MODULE

(71) Applicant: RENISHAW PLC, Wotton-under-Edge (GB)

(72) Inventors: John Anthony Styles, Wotton-under-Edge (GB); Paul Anthony Taylor, Wotton-under-Edge (GB)

(73) Assignee: RENISHAW PLC, Wotton-under-Edge (GB)

( * ) Notice: Subject to any disclaimer, the term of this patent is extended or adjusted under 35 U.S.C. 154(b) by 399 days.

(21) Appl. No.: 18/283,065

(22) PCT Filed: Apr. 6, 2022

(86) PCT No.: PCT/GB2022/050854
§ 371 (c)(1),
(2) Date: Sep. 20, 2023

(87) PCT Pub. No.: WO2022/219306
PCT Pub. Date: Oct. 20, 2022

(65) Prior Publication Data
US 2024/0171214 A1 May 23, 2024

(30) Foreign Application Priority Data
Apr. 14, 2021 (EP) .................................... 21168394

(51) Int. Cl.
*H04B 1/7156* (2011.01)
*G01B 5/008* (2006.01)

(52) U.S. Cl.
CPC ........... *H04B 1/7156* (2013.01); *G01B 5/008* (2013.01); *G01B 2210/58* (2013.01)

(58) Field of Classification Search
None
See application file for complete search history.

(56) References Cited

U.S. PATENT DOCUMENTS 4,442,527 A 4/1984 Munday
4,606,040 A * 8/1986 David .................. H04B 1/7156 380/34
(Continued)

FOREIGN PATENT DOCUMENTS

CN 1732488 A 2/2006
CN 1820426 A 8/2006
(Continued)

OTHER PUBLICATIONS

Toll, Analog Scanning vs. Touch Probing. (Year: 2007).*
(Continued)

*Primary Examiner* — Brian A Zimmerman
(74) *Attorney, Agent, or Firm* — Oliff PLC

(57) ABSTRACT

A frequency hopping radio communications module includes a clock and a memory for storing a hopping pattern. The communications module is switchable between first, second, and third modes. The first and second modes respectively transmit and/or receive data using a series of frames having first and second frame times. The first frame time is equal to, or an integer multiple of, the base time interval. The second frame time is an integer multiple of the first frame time. Operation in the third mode includes transmitting and/or receiving data using a series of frames having a third frame time, the third frame time being an integer multiple of the second frame time. Each successive base time interval is associated with a successive frequency channel of the hopping pattern sequence and each frame uses the frequency channel associated with the base time interval that occurs at the start of that frame.

15 Claims, 8 Drawing Sheets

(56) References Cited

U.S. PATENT DOCUMENTS

| | | | | |
|---|---|---|---|---|
| 5,519,717 | A | 5/1996 | Lorenzo et al. | |
| 6,173,004 | B1 | 1/2001 | Ohashi | |
| 6,345,066 | B1 | 2/2002 | Haartsen | |
| 7,408,916 | B2 | 8/2008 | Kassinen et al. | |
| 7,821,420 | B2 | 10/2010 | Woollett et al. | |
| 9,008,149 | B2 | 4/2015 | Huettinger et al. | |
| 9,140,547 | B2 | 9/2015 | Woollett et al. | |
| 9,423,235 | B2 | 8/2016 | Jordil et al. | |
| 11,209,258 | B2 | 12/2021 | Styles et al. | |
| 2002/0159434 | A1* | 10/2002 | Gosior | H04L 1/1685 370/336 |
| 2003/0128741 | A1 | 7/2003 | Chun | |
| 2005/0195772 | A1 | 9/2005 | Nishikawa et al. | |
| 2006/0215614 | A1 | 9/2006 | Woollett et al. | |
| 2007/0287542 | A1* | 12/2007 | Miyazaki | A63F 13/30 725/133 |
| 2011/0002361 | A1 | 1/2011 | Woollett et al. | |
| 2012/0004886 | A1 | 1/2012 | Jordil et al. | |
| 2013/0273965 | A1 | 10/2013 | Jechoux et al. | |
| 2014/0119408 | A1 | 5/2014 | Huettinger et al. | |
| 2014/0204930 | A1 | 7/2014 | Knowles | |
| 2015/0190099 | A1 | 7/2015 | Aratani | |
| 2016/0072548 | A1 | 3/2016 | Shih et al. | |
| 2019/0376777 | A1 | 12/2019 | Styles et al. | |
| 2024/0171213 | A1* | 5/2024 | Styles | H04B 1/7143 |
| 2024/0171214 | A1* | 5/2024 | Styles | H04B 1/7156 |

FOREIGN PATENT DOCUMENTS

| | | | | | |
|---|---|---|---|---|---|
| CN | 103796295 | A | | 5/2014 | |
| CN | 104619238 | A | | 5/2015 | |
| CN | 105915265 | A | | 8/2016 | |
| EP | 2402714 | A1 | | 1/2012 | |
| EP | 2901920 | A1 | | 8/2015 | |
| EP | 4075680 | A1 | * | 10/2022 | H04B 1/7156 |
| EP | 4324102 | B1 | * | 11/2025 | G01B 5/008 |
| JP | 5877905 | B2 | | 3/2016 | |
| WO | 99/60718 | A1 | | 11/1999 | |
| WO | WO-2004057552 | A1 | * | 7/2004 | G01B 21/047 |
| WO | 2006/006899 | A1 | | 1/2006 | |
| WO | 2014/091202 | A1 | | 6/2014 | |
| WO | 2018/134585 | A1 | | 7/2018 | |
| WO | WO-2022219306 | A1 | * | 10/2022 | G01B 5/008 |

OTHER PUBLICATIONS

Jan. 3, 2025 U.S. Office Action issued in U.S. Appl. No. 18/283,279.
Jun. 1, 12, 2025 Office Action issued in U.S. Appl. No. 18/283,279.
Oct. 8, 2025 Office Action issued in U.S. Appl. No. 18/283,250.
Jun. 14, 2022 International Search Report issued in International Patent Application No. PCT/GB2022/050854.
Jun. 14, 2022 Written Opinion issued in International Patent Application No. PCT/GB2022/050854.
U.S. Appl. No. 18/283,250, filed Sep. 21, 2023 in the name of Styles.
Jun. 9, 2022 International Search Report issued in International Patent Application No. PCT/GB2022/050855.
Jun. 9, 2022 Written Opinion issued in International Patent Application No. PCT/GB2022/050855.
Jun. 9, 2022 International Search Report issued in International Patent Application No. PCT/GB2022/050853.
Jun. 9, 2022 Written Opinion issued in International Patent Application No. PCT/GB2022/050853.
U.S. Appl. No. 18/283,279, filed Sep. 21, 2023 in the name of Styles.
May 4, 2026 Notice of Allowance issued in U.S. Appl. No. 18/283,250.

* cited by examiner

MEASUREMENT DEVICE AND A MEASUREMENT INTERFACE HAVING A RADIO COMMUNICATIONS MODULE

The present invention relates to a measurement device and a measurement interface that include a frequency hopping radio communications module. In particular, the invention relates to such a frequency hopping radio communications module used in a machine tool measurement probe and/or an associated probe interface to allow a variety of types of measurement data to be communicated.

Co-ordinate positioning apparatus (e.g. machine tools) are often equipped with a measurement device, for example a touch trigger probe which measures the position of points on the surface of a workpiece. A touch trigger probe has a stylus which, when deflected by contact with a surface, produces a so-called trigger signal. This trigger signal is used to freeze the outputs of the measurement scales of the machine tool thereby indicating the position of the probe and thus, with appropriate calibration, the position of a point on the surface of the workpiece.

In certain circumstances, for example when it is difficult to wire a probe directly to a machine controller, a wireless transmission system is used to communicate the trigger signal to the machine controller via a probe interface. In particular, it is known to use frequency hopping spread spectrum (FHSS) communications between the probe and probe interface. Such a communications protocol is described in WO2004/057552 and is also used in the "RMP" range of machine tool probes and the associated "RMI" probe interfaces sold by Renishaw plc, Wotton-under-Edge, Gloucestershire, UK. A similar FHSS communications protocol is also used in the Primo range of measurement probes, also sold by Renishaw plc. It has been found that the above described FHSS systems provide robust communications in often harsh (RF) operating environments.

Frequency hopping communication links rely on maintaining close synchronisation between the two ends of the link, regardless of whether a transmission is going to be made. This is to ensure the two stations hop together (i.e. in synchronisation) between the frequency channels according to a predefined hopping pattern. The maintenance of such frequency channel synchronisation is especially important for systems that relay time critical information, such as the trigger event information transmitted between a measurement probe and associated interface. The frame time (i.e. the duration that each frequency channel is used) is typically fixed during manufacture and each end of the communication link uses the same frame rate. The frame time is selected to strike a balance between the advantages of using a shorter frame time (which allows time critical data to be relayed more quickly) and the advantages of using a longer frame times (which allows more data to be transmitted per frame). The present inventors have recognised that using such a fixed frame time approach makes it difficult to use the same communication modules for measurement devices that can be operated in different ways that produce different amounts of measurement data.

Frequency hopping systems are also known for general, non-measurement specific, applications. For example, U.S. Pat. No. 4,606,040 describes a frequency hopping system that employs high-speed and low-speed skip laws.

According to a first aspect of the present invention, there is provided a measurement device, comprising a measurement sensor for generating metrology data and a frequency hopping radio communications module for transmitting and receiving a radio signal over a plurality of frequency channels,

- the frequency hopping radio communications module comprising a clock for defining a series of base time intervals, and a memory for storing a hopping pattern describing a sequence of frequency channels,
- wherein the communications module is operable in at least a first mode, a second mode and a third mode,
- operation in the first mode comprises transmitting and/or receiving data using a series of frames having a first frame time, the first frame time being equal to or an integer multiple of the base time interval,
- operation in the second mode comprises transmitting and/or receiving data using a series of frames having a second frame time, the second frame time being an integer multiple of the first frame time,
- operation in the third mode comprises transmitting and/or receiving data using a series of frames having a third frame time, the third frame time being an integer multiple of the second frame time, and
- each successive base time interval is associated with a successive frequency channel of the hopping pattern sequence, each frame using the frequency channel associated with the base time interval that occurs at the start of that frame.

In this first aspect, the present invention relates to a measurement device comprising a frequency hopping spread spectrum (FHSS) radio communications module and measurement sensor. The radio communications module allows a FHSS (wireless) radio communication link to be established, for example with a measurement interface that includes a similar FHSS radio communications module. In a preferred embodiment, the measurement device may be used to wirelessly communicate measurement data from a battery-operated measurement device or probe to a measurement interface that is hardwired to a machine tool. The communications module is configured to transmit and/or receive a radio signal over multiple frequency channels. These frequency channels may be within a certain frequency band or bands (e.g., the frequency channels may be spread over the 2.4 GHz radio band). Data packets may then be transmitted and received during each frame on the designated frequency channel.

The communications module includes a clock for defining a series of base time intervals. For example, the base time intervals may be defined by the rising and falling edges of a square wave clock signal. A memory is also provided for storing a hopping pattern describing a sequence or series of frequency channels. In other words, the hopping pattern defines the order in which a series of frequency channels can be used. Each successive base time interval is associated with a successive frequency channel of the hopping pattern sequence. In other words, each successive base time interval is allocated the next frequency channel in the hopping pattern. The hopping pattern is continually cycled through (i.e. repeated).

The communications module can adopt and switch between a plurality of different modes that have different frame times (i.e. that operate at different frame rates). In particular, the communications module is switchable between (i.e. operable in) at least a first mode, a second mode and a third mode that have different frame times. The first mode transmits and/or receives data using a series of frames (first frames) having a first frame time that is equal to or an integer multiple of the base time interval. The second mode transmits and/or receives data using a series of frames (second frames) having a second frame time that is an integer multiple of the first frame time. For example, the first mode may use a frame time oft and the second mode may use a frame time of 2t, 4t, 8t etc. In a preferred embodiment, the second frame time is double the base time interval. The third mode transmits and/or receives data using a series of frames (third frames) having a third frame time. The third frame time is an integer multiple of the second frame time. This also means the third frame time is an integer multiple of the base time interval. In a preferred embodiment, the third frame time is quadruple (i.e. four times) the base time interval.

To provide a robust communications link, each frame (i.e., each frame of the first, second and third modes) uses the frequency channel associated with the base time interval that occurs at the start of that frame. The term “frame” is thus used herein to collectively describe each of the first frames, second frames and third frames. This ensures that even if the different modes, and hence different frame times, are used the frequency channels used by the communications module always coincide with those used by a similar associated communications module (e.g., within a measurement interface) with which a communications link has been established. In other words, this allows frequency hopping synchronisation to be maintained with an associated communications module using the same hopping pattern, even when such communication modules are operating in different modes (e.g. when one communications module is operating in the first mode and the other communications module is operating in the second mode).

The present invention makes it possible to change the frame rate during operation without the risk of losing the link (e.g., due to a dropped transmission) and having to re-establish synchronisation between the two ends of the communications link from scratch. The present invention is thus particularly suited for use with measurement devices in the form of measurement probes that can generate different quantities of measurement data depending on the measurement task they are performing.

It should be noted that the communications module included in the measurement device of the present invention may be implemented in a variety of ways. For example, the communications module may comprise a suitably configured circuit or processor. The communications module may also comprise a RF antenna or it may be connectable to an associated RF antenna. As explained below, the communications module is incorporated into a measurement device (e.g. a measurement probe) but a similar communications module may be provided as part of a measurement interface to enable communication with the measurement device. The communications module may also comprise a processor for calculating the hopping patterns (e.g. from a unique identified as described below). Other components may be included with the communications module and the communications module may also operate in other modes (e.g., in legacy communication modes).

For convenience, the first frame time is equal to the base time interval. In other words, the base time interval may also define the first frame time. This avoids the need to derive another timing signal from the clock signal. The second frame time is an integer multiple of the first frame time. The second frame time may also be an integer multiple of the base time interval. Preferably, the second frame time is equal to M times the base time interval, where $M=2^N$ and N is an integer of one or more. The second frame time may thus be twice, quadruple etc the base time interval. Preferably, the second frame time is twice the base time interval.

If the first frame time is equal to the base time interval, then the frames of the first mode just follow the full hopping pattern. If the second frame time is twice the base time interval, then the frequency channels used in the second mode will skip every other frequency channel defined in the full hopping pattern. However, if an odd number of frequency channels are provided (as per typical systems) all frequency channels are employed during two repetitions of the hopping pattern.

The ability to increase and decrease the frame time means that the communications module can adapt to the measurement data it is required to communicate (e.g. the data received by an interface and transmitted by a measurement device). A longer frame time can be used for larger data packets and a shorter frame time can be used when faster communications are needed. Advantageously, the first mode is suitable for standby communications of non-metrology data. Such non-metrology data may include the periodic timing signals that need to be exchanged to maintain the synchronisation of both ends of the frequency hopping communications link. The lower power requirements of such a first mode may be advantageous for preserving battery life. The second mode may be suitable for the communication of measurement data. For example, the second mode may be optimised for transmitting touch trigger data. The frame time used for the communication of such touch trigger data may allow low latency, with the ability to retransmit any data related to trigger events that does not get received on the first transmission.

The third mode has a longer frame time than the first and second modes. The third mode may thus communicate larger data packets. The third mode may be considered a bulk data transfer mode. In a preferred embodiment, the third mode is suitable for the communication of analogue probe data. As explained below, an analogue probe may not merely indicate the proximity or contact with a point on a surface but may include data describing the position of multiple points on the surface within its local coordinate system. For example, an analogue probe may include a stylus for contacting an object and deflection sensors that measures the stylus deflection in a local coordinate system. If the stylus is scanned over the surface, a stream of probe deflection data may be collected and transmitted over the communications link (i.e. using the third mode of operation). If the analogue probe is operating in touch trigger mode, it is only necessary to transmit a trigger signal when stylus deflection occurs as the stylus is moved into contact with a surface. Such touch trigger data may be communicated using the second mode. There may also be times when no measurements are needed, but the analogue probe may be needed shortly. In such an example, the first mode may be used to reduce power consumption but to maintain a synchronised communications link.

Advantageously, the base time interval is at least 0.25 ms. In an embodiment described below, the base time interval is 0.25 ms. The first mode may then have a frame time of 0.25 ms, the second mode may have a frame time of 0.5 ms and any third mode may have a frame time of 1 ms.

A communications module (e.g., of the measurement device) may receive an instruction to change mode over a communications link already established with another communications module (e.g., provided within a measurement interface as described below). Alternatively, the communications module may have an input for receiving such an instruction to change mode and then instruct an associated communications module to also switch modes over a communications link that has already been established. The communications module may thus have an input for receiving an instruction to change between the first and second modes and be configured to send a message to change mode to an associated communications module over the frequency hopping link. A communications module acting as a transmission master, or as a transmission slave, may communicate an instruction to the associated communications module to change mode.

As explained below, there may be circumstances where a change in mode instruction that is communicated over the communications link needs to be accompanied by timing information. For example, if the frames of a first mode are triggered off both the rising and falling edges of a clock pulse it may be necessary to provide data to the other end of the link about which edge of the clock pulse will be used to define the frames of the second mode. The message to change mode may thus include timing information for synchronising the base timing intervals of the communications module and the associated communications module.

Although communicating pairs of communication modules need to use the same hopping pattern, communications between different pairs of communication modules may use different hopping patterns to reduce the possibility of interference between co-located systems. For example, measurement interfaces may use different hopping patterns to communicate with different measurement devices. Alternatively, each measurement interface may use certain (e.g. predefined) hopping pattern(s) that it passes to each associated measurement device during an initial partnering process. A different hopping pattern (known to both ends of the link) may also be used to initially establish a communications link or whilst a measurement device is in a standby mode. For example, a hopping pattern that uses fewer frequency channels may be used. This helps to reduce the power consumption needed if a measurement device needs to repeatedly check to see if it should exit a standby mode. It should also be noted that the communications protocol may include appropriate sequences of acknowledgements, with redundancy (e.g. retransmissions etc) to guard against the non-receipt of messages due to interference etc.

The communications module may be formed in any appropriate manner. For example, the module may be formed as a circuit board (e.g. an FPGA module) and/or comprise a transceiver for mounting inside a measurement probe and/or within a measurement probe interface. The circuit board may implement other functions connected to the frequency hopping communications or for other processes. The module may include a master clock and/or a sliding correlator to recover the master clock from received signals. The module may include any one or more of the features described in WO2004/057552.

The plurality of frequency channels used by the communications module may comprise frequency channels within the 2.4 GHz radio frequency band (which extends from 2.4000-2.4835 GHz). This is also known as the Industrial, Scientific and Medical (ISM) band and is licence free in most countries. Each frequency channel may be 2 MHz wide, although it should be noted that any transmission may only be over a part of the frequency range of each channel. In a preferred embodiment, 39 channels are provided (each 2 MHz wide) that extend from 2.404 GHz to 2.480 GHz. It should be noted that the invention may be used in any radio frequency band and is not limited to ISM band operation. Preferably, the module is configured to operate on a standard, licence free, wireless frequency band. It should be noted that such frequency bands may vary from country to country, or over time, depending on regulatory rules but this does not alter the benefits associated with the present invention. It should also be noted that the communications module (and hence the measurement device) may be classed as a digital transmission system (DTS) or a hybrid system, rather than a FHSS system as per the formal Federal Communications Commission (FCC) definition.

The first aspect of the present invention relates to a measurement device (e.g., a measurement probe) that includes the above-described frequency hopping radio communications module. The measurement device also comprises a measurement sensor for generating metrology data. The measurement sensor may be of any type. For example, it may allow the measurement of dimensions, positions, temperature etc. The sensor may be a contact sensor (i.e. it may physically touch an object being measured) or it may be a non-contact sensor (e.g. it may use optical, inductive, capacitive etc sensing). In a preferred embodiment, the measurement sensor of the measurement device comprises a touch trigger sensor. The touch trigger sensor may generate a trigger signal on attaining a certain spatial relationship with a point on the surface of an object. For example, a trigger signal may be generated when a stylus is deflected. The measurement probe may be for a machine tool. The trigger signal may be communicated to the associated interface when the communications module is operating in metrology mode. The measurement probe may also include at least one of a stylus, a shank and a battery. As explained above, the measurement sensor may comprise an analogue probe. The measurement sensor of the measurement device may thus comprise at least one of a touch trigger sensor, a scanning sensor, an ultrasound sensor or an imaging sensor. The measurement device may include multiple measurement sensors (e.g. a touch trigger sensor and a temperature sensor).

The measurement device may be battery operated. It is therefore advantageous for the measurement device to use as little electrical power as possible to maximise battery life. The communications module of the measurement device may thus be configured to passively receive information (whilst hopping between channels) until an activation message is received from the associated measurement interface. The frame rate used when passively listening for an activation message may be greater than the frame rate of the associated measurement interface. In particular, the duration of each frame used by the measurement device may be set to be at least equal to the time taken for the associated measurement interface to cycle through each of the frequency channels (e.g. one cycle through the second hopping pattern). Once an activation message is received, the measurement device may transmit information (e.g. to acknowledge receipt of the activation message) to the measurement interface and begin operating at the full frame rate.

The communications module of the measurement device may act as the transmission master or the transmission slave. In other words, either end of the link may be the transmission master for controlling the communications link. The measurement device may be the transmission master when metrology information is being transmitted (e.g., in the second mode and/or third mode). The measurement interface may be the transmission master when no metrology information is being communicated (e.g., in the first mode).

In a preferred embodiment, each measurement device comprises a unique identifier. For example, each measurement device may be assigned a unique identification code (e.g. a probe ID code). The hopping pattern used for communication with that measurement device may then be derived from that unique code. It follows that, in such an example, the unique identifier should be known by the measurement device and by the associated interface (e.g. by pre-programming or via a previous pairing process). Alternatively, one communication module may transmit a hopping pattern to the other communication module during an initial pairing or partnering process. For example, the measurement device may receive a hopping pattern from an associated interface. This transmission of information may be performed during an initial partnering process. This allows both ends of the communications link to use the same hopping pattern. Each transmitted message may also include a header that includes information about the measurement device that is to be activated (e.g. it may contain the probe ID). In this manner, it can be further ensured communications are established acted upon between the required measurement device and measurement interface pair.

In accordance with a further aspect of the present invention, there is provided a measurement interface for communicating (i.e., using the FHSS link) with the measurement device of the first aspect of the present invention. The measurement interface may include a communications module (i.e., a second, or interface, communications module) having some or all of the features described above in connection with the communications module of the measurement device. The measurement interface may be hardwired to an associated machine. The measurement interface may be mains (i.e., not battery) powered. For example, the measurement interface may be connected (hardwired) to a machine tool controller.

Advantageously, the measurement interface is for communicating with a plurality of associated measurement devices. The measurement interface may have an output for passing the measurement data received from an associated measurement device to an associated machine (e.g., to a machine tool controller or an industrial PC etc). The measurement interface may include a plurality of different outputs for different types of measurement data. Analogue probe data may be passed to an industrial PC for processing via an Ethernet or industrial Ethernet link. A trigger signal generated by a touch trigger sensor may be passed directly to a machine tool controller from the interface over a real time link. For example, such a touch trigger signal may be output by latching the voltage of a line connected to the SKIP input of the controller or by generating a pulse or series of pulses that are passed to the SKIP input. The trigger signal may alternatively be passed to the controller over a digital data bus (e.g. as described in WO2018/134585).

In a preferred embodiment, a measurement interface is provided that comprises a frequency hopping radio communications module for transmitting and receiving a radio signal over a plurality of frequency channels, the frequency hopping radio communications module comprising a clock for defining a series of base time intervals, and a memory for storing a hopping pattern describing a sequence of frequency channels, wherein the communications module is operable in at least a first mode, a second mode and a third mode, operation in the first mode comprises transmitting and/or receiving data using a series of frames having a first frame time, the first frame time being equal to or an integer multiple of the base time interval, operation in the second mode comprises transmitting and/or receiving data using a series of frames having a second frame time, the second frame time being an integer multiple of the first frame time, operation in the third mode comprises transmitting and/or receiving data using a series of frames having a third frame time, the third frame time being an integer multiple of the second frame time, and each successive base time interval is associated with a successive frequency channel of the hopping pattern sequence, each frame using the frequency channel associated with the base time interval that occurs at the start of that frame. The frequency hopping radio communications module of the measurement interface may have any of the features described above for the frequency hopping radio communications module of the measurement device.

The measurement interface may comprise an input for receiving an instruction to change between the first, second and third modes, the frequency hopping radio communications module of the measurement interface being configured to send a message to change mode to the frequency hopping communications module of the measurement device over the frequency hopping communications link. The message to change mode may include timing information for synchronising the base timing intervals of the communications module of the measurement device with those of the communications module of the measurement interface.

The present invention also extends to a measurement system that comprises one or more measurement devices and a measurement interface. Each component of the measurement system (i.e., each measurement device and the measurement interface) may include a communications module of the present invention. Legacy communication protocols may also be provided in such modules. In a preferred embodiment, the measurement system is for use on a machine tool.

Also described herein is a frequency hopping radio communications module for transmitting and/or receiving radio signals using a plurality of frequency channels, the communications module being operable in at least first and second modes, wherein the frame time of the first mode is an integer multiple of the frame time of the second mode. The module may include any of the other features described herein.

Also described herein is a method of using a frequency hopping radio communications module for the communication of measurement data. The communication module may include a clock for defining a series of base time intervals. The method may comprise using a hopping pattern describing a sequence of frequency channels. The method may also include the step of switching the communications module being between at least a first mode and a second mode, the first mode transmitting and/or receiving data using a series of frames having a first frame time and the second mode transmitting and/or receiving data using a series of frames having a second frame time. Conveniently, the first frame time is equal to or an integer multiple of the base time interval and the second frame time is an integer multiple of the first frame time. The method may also include the steps of associating each successive base time interval with a successive frequency channel of the hopping pattern sequence and using the frequency channel associated with the base time interval that occurs at the start of that frame for each frame.

Also described herein is a measurement device, including a measurement sensor for generating metrology data and comprising a frequency hopping radio communications module comprising a clock for defining a series of base time intervals, and a memory for storing a hopping pattern describing a sequence of frequency channels, the communications module being switchable between at least a first mode and a second mode, the first mode transmitting and/or receiving data using a series of frames having a first frame time and the second mode transmitting and/or receiving data using a series of frames having a second frame time, the first frame time being equal to or an integer multiple of the base time interval and the second frame time being an integer multiple of the first frame time, wherein each successive base time interval is associated with a successive frequency channel of the hopping pattern sequence and each frame uses the frequency channel associated with the base time interval that occurs at the start of that frame. The measurement device may have any one or more of the features described above.

Also described herein is a measurement interface that includes a communications module comprising; a clock for defining a series of base time intervals, and a memory for storing a hopping pattern describing a sequence of frequency channels, the communications module being switchable between at least a first mode and a second mode, the first mode transmitting and/or receiving data using a series of frames having a first frame time and the second mode transmitting and/or receiving data using a series of frames having a second frame time, the first frame time being equal to or an integer multiple of the base time interval and the second frame time being an integer multiple of the first frame time, wherein each successive base time interval is associated with a successive frequency channel of the hopping pattern sequence and each frame uses the frequency channel associated with the base time interval that occurs at the start of that frame. The measurement interface may have any one or more of the features described above.

The invention also extends to a kit that comprises a measurement interface and at least one measurement probe, as described above. The present invention also extends to an analogous method of operating a FHSS communications module or measurement system.

Also describe herein is a frequency hopping radio communications module for a measurement system, comprising; a clock for defining a series of base time intervals, and a memory for storing a hopping pattern describing a sequence of frequency channels, the communications module being switchable between at least a first mode and a second mode, the first mode transmitting and/or receiving data using a series of frames having a first frame time and the second mode transmitting and/or receiving data using a series of frames having a second frame time, the first frame time being equal to or an integer multiple of the base time interval and the second frame time being an integer multiple of the first frame time, wherein each successive base time interval is associated with a successive frequency channel of the hopping pattern sequence and each frame uses the frequency channel associated with the base time interval that occurs at the start of that frame. The frequency hopping spread spectrum (FHSS) radio communications module can be used in a measurement system to establish a FHSS (wireless) radio communication link between different system components. In a preferred embodiment, communication modules of the present invention may be used for the wireless communication of measurement data from a plurality of battery-operated measurement probes to a measurement interface that is hardwired to a machine tool. For example, it may be provided as part of a measurement device and/or measurement interface. The frequency hopping radio communications module may have any of the features described above.

Also described herein is frequency hopping radio communications module. The frequency hopping radio communications module may be suitable for a measurement system. The module may include a clock. The clock may be suitable for defining a series of base time intervals. The module may include a memory. The memory may be for storing a hopping pattern describing a sequence of frequency channels. The communications module may include a transceiver. The communications module may include a means for transmitting and/or receiving a RF signal. The communications module (e.g., the transceiver) may be switchable between (i.e., operable in) at least a first mode and a second mode. The first mode may be for transmitting and/or receiving data using a series of frames having a first frame time. The second mode may be for transmitting and/or receiving data using a series of frames having a second frame time. The first frame time may be equal to or an integer multiple of the base time interval. The second frame time may be an integer multiple of the first frame time. Each successive base time interval may be associated with a successive frequency channel of the hopping pattern sequence. Each frame may use the frequency channel associated with the base time interval that occurs at the start of that frame. The communications module may include a processor for controlling the communication process. For example, such a processor may control the transceiver to enable radio communications in the first, second and the optional third mode. The communications module may have any one or more of the features described elsewhere herein.

The invention will now be described, by way of example only, with reference to the accompanying drawings in which.

Figure 1:
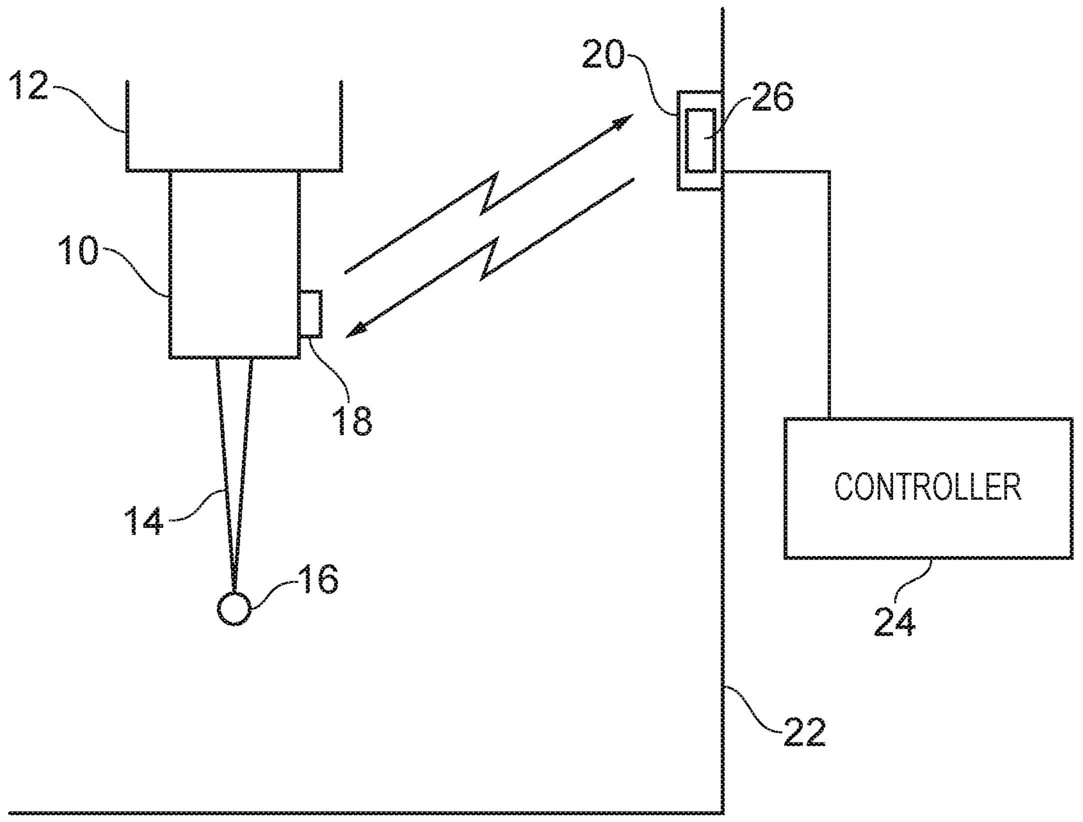
FIG. 1 illustrates a machine tool measurement probe and probe interface.
Figure 4:
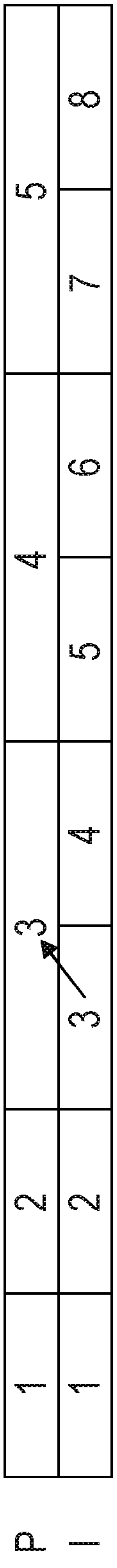
Figure 5:
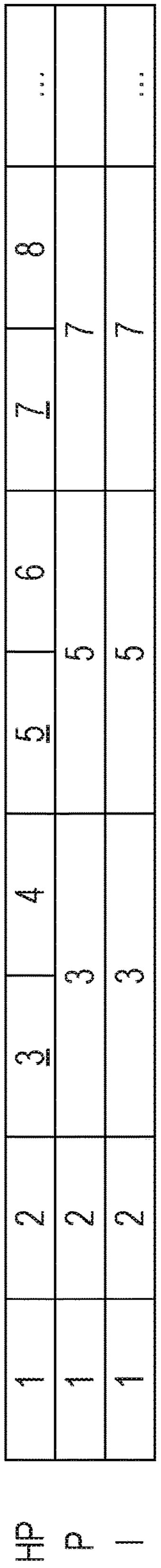
Figure 6:
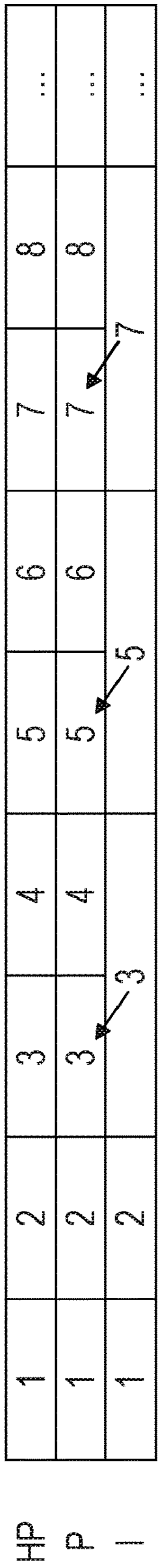
Figure 7:
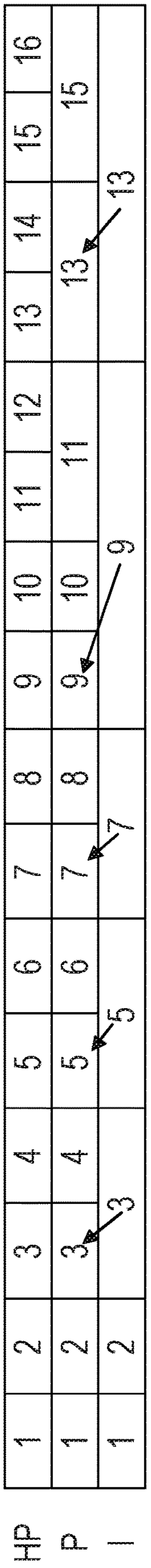
Figure 8:
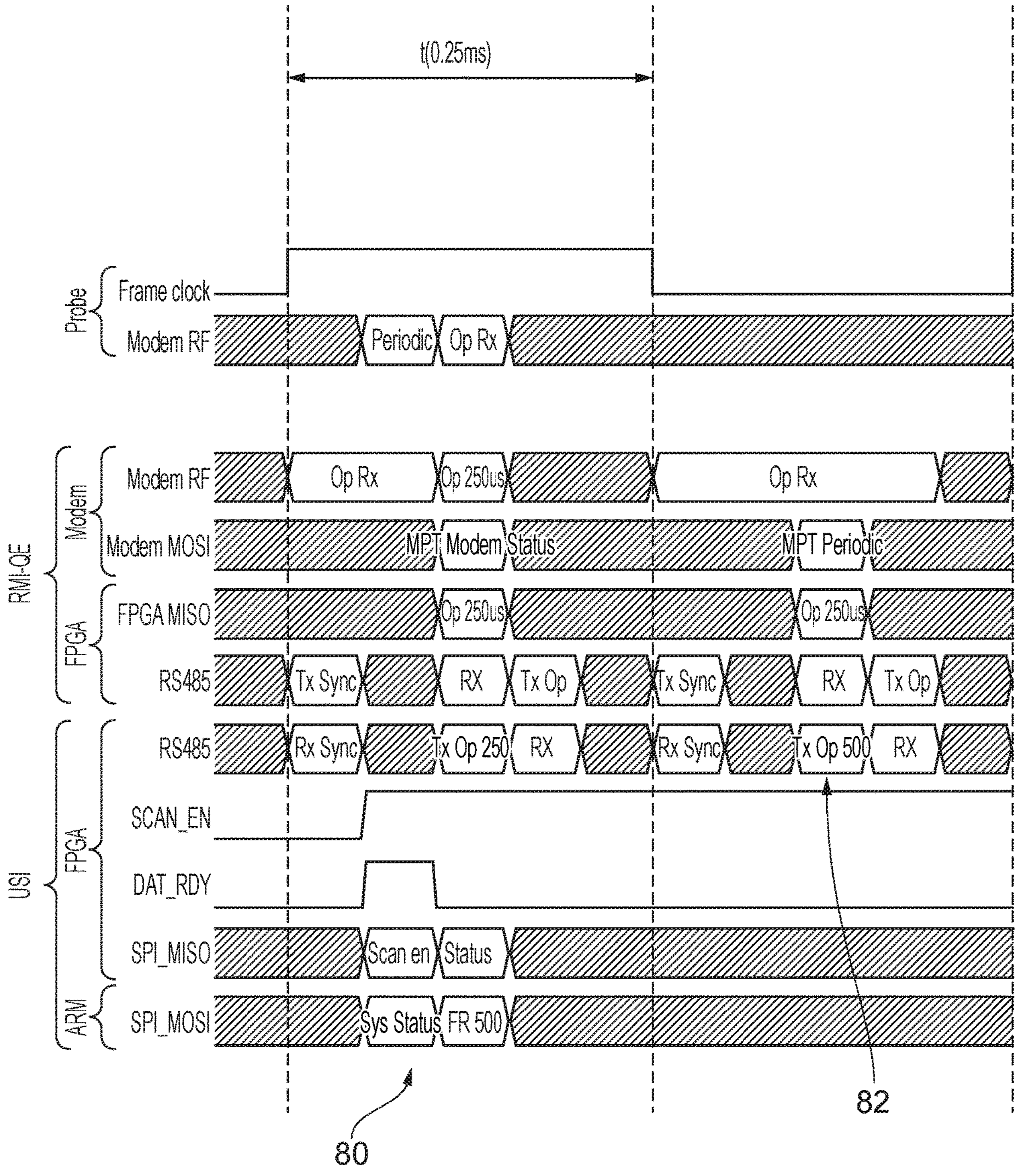
Figure 8:
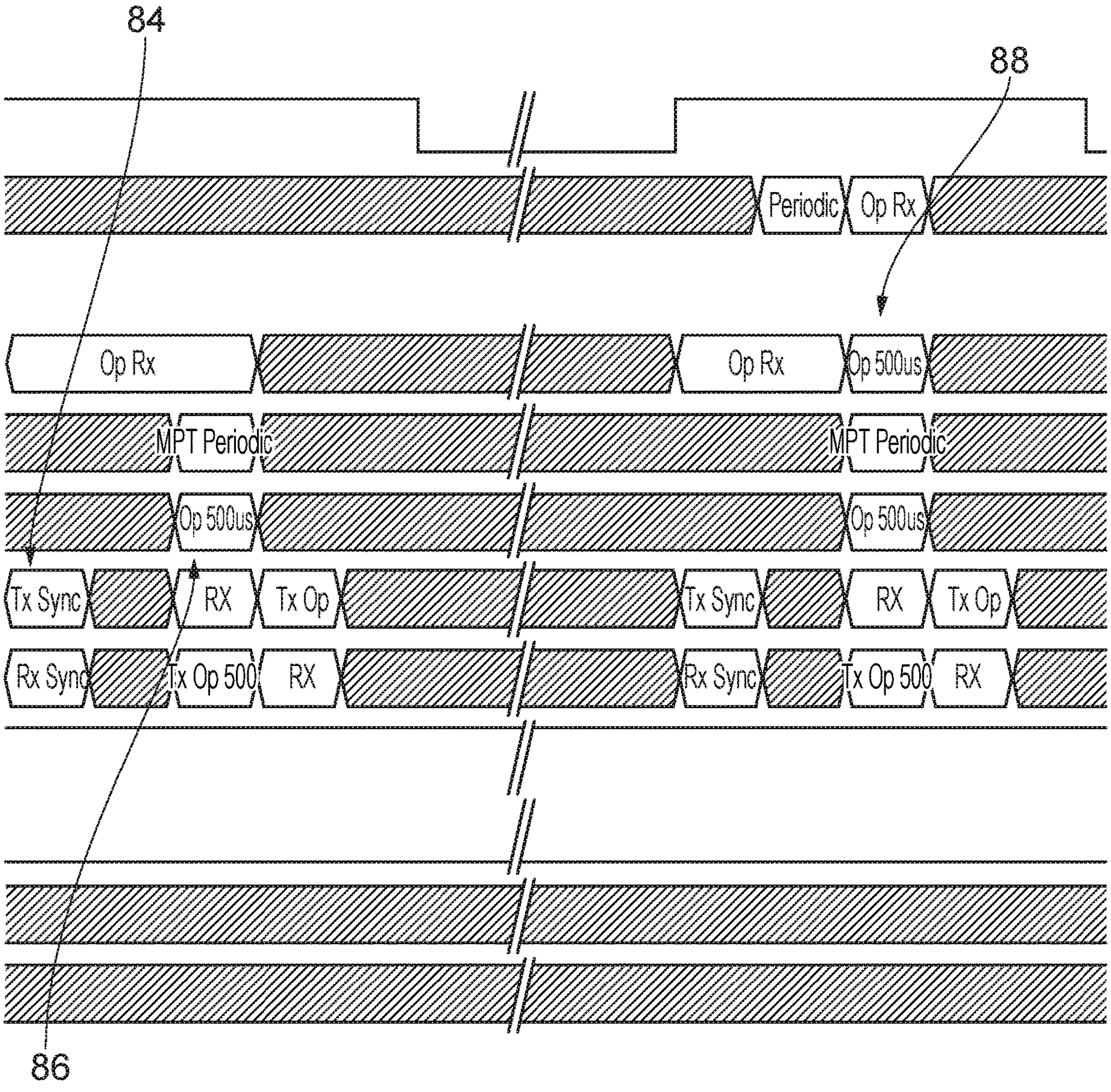
Figure 9:
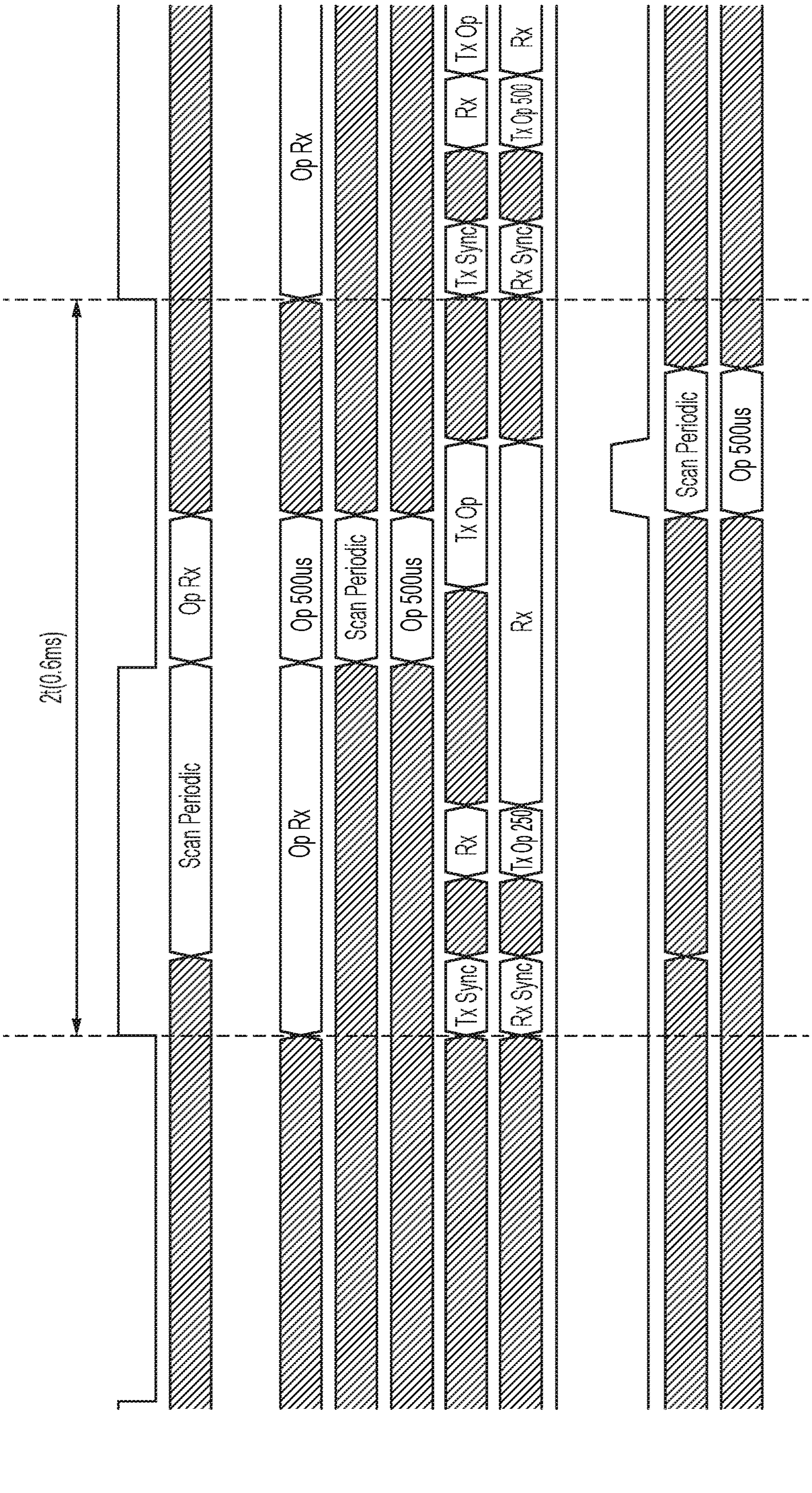
Figure 10:
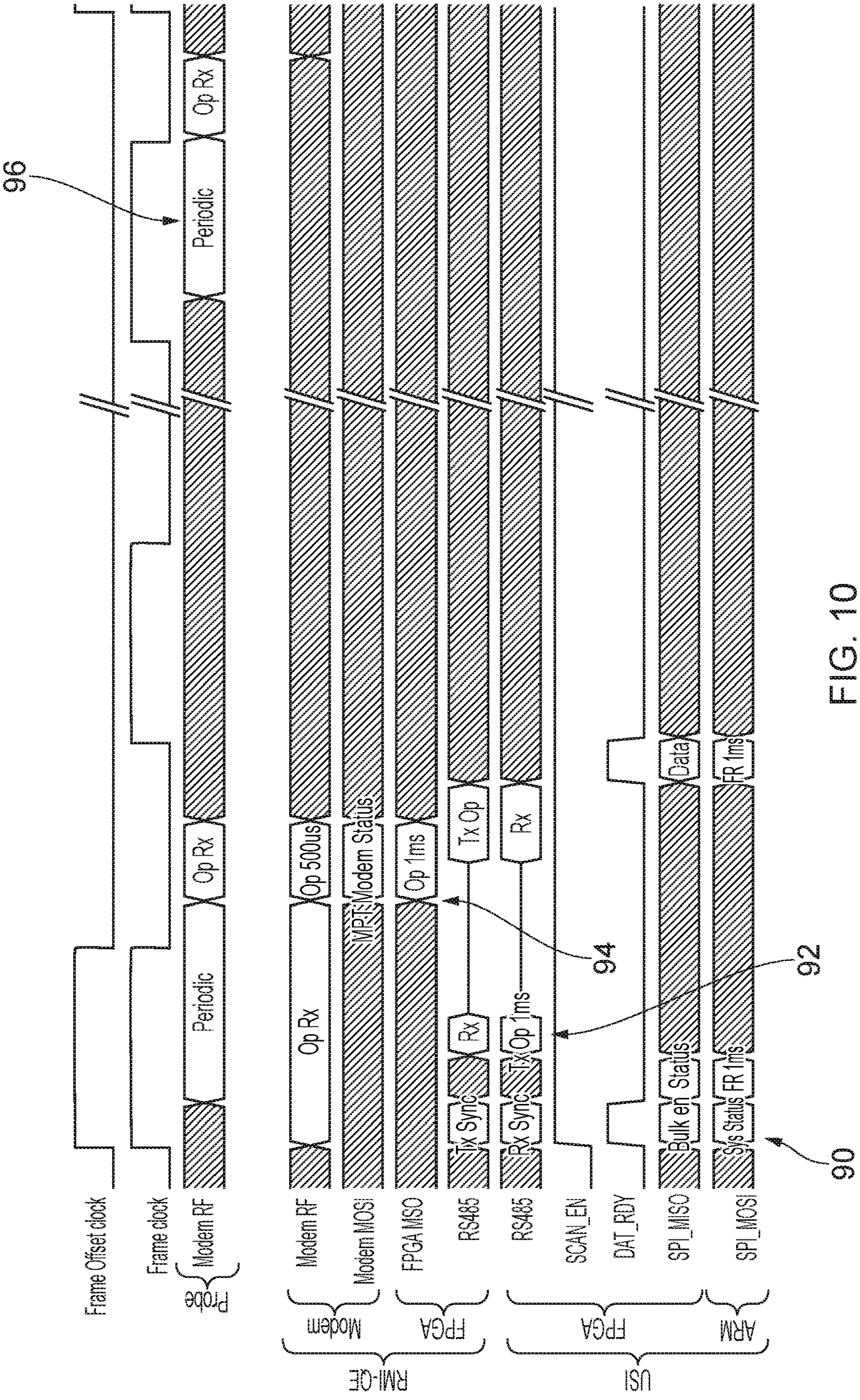
Figure 11:
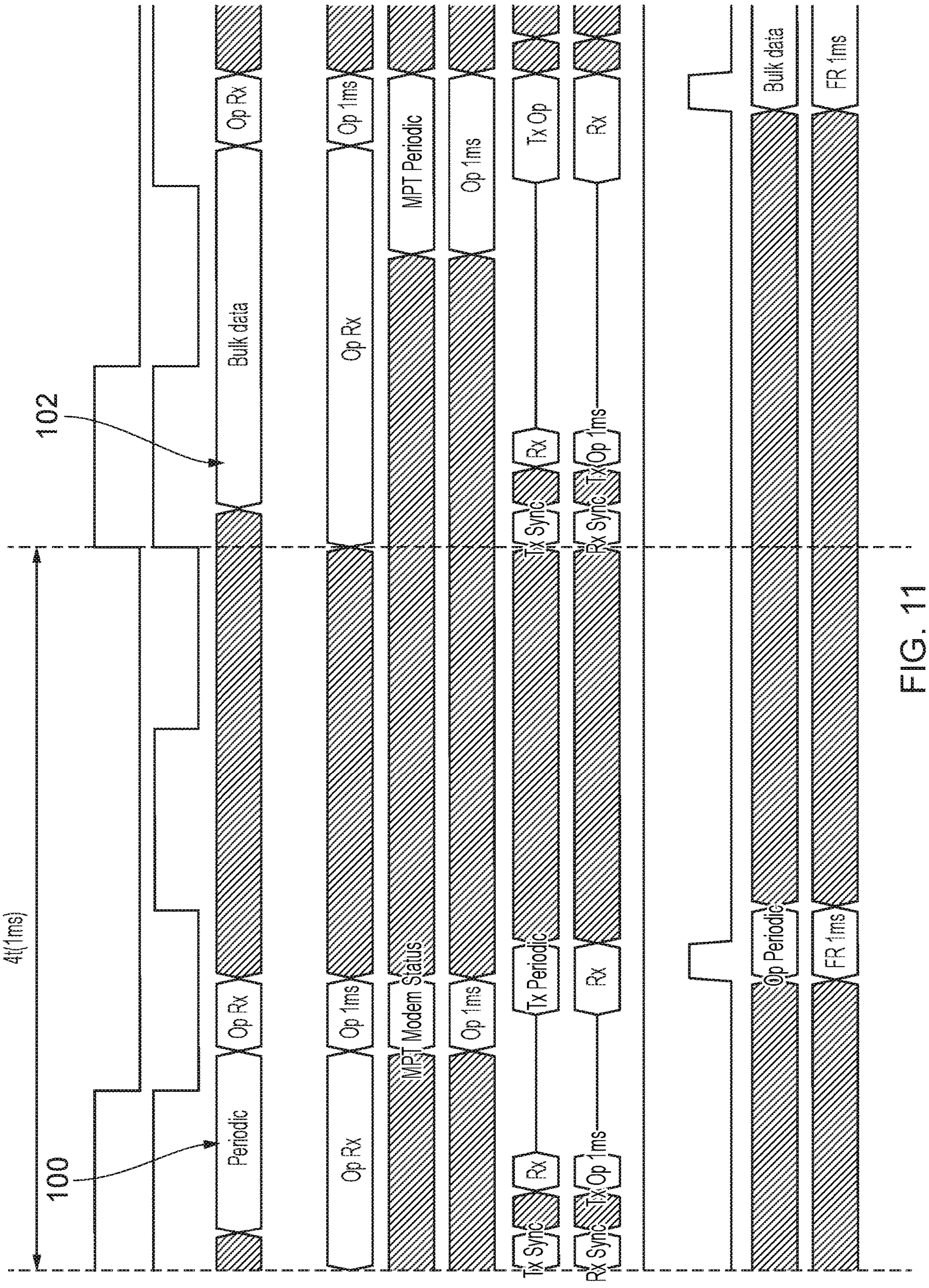

FIG. 4 illustrates how synchronised hopping can be lost if the frame rate changes, FIG. 5 shows frame rate adjustment using the technique of the present invention, FIG. 6 shows the resilience of such frame rate adjustment to interference that prevents receipt of messages, FIG. 7 illustrates adjusting between three different frame rates, FIG. 8 illustrates an implementation of the change between 0.25 ms and 0.5 ms frame rates, FIG. 9 shows operation with a 0.5 ms frame rate, FIG. 10 illustrates an implementation of the change between 0.5 ms and 1.0 ms frame rates, and FIG. 11 shows operation with a 1.0 ms frame rate, Referring first to FIG. 1, there is illustrated a touch trigger measurement probe 10 mounted to the spindle 12 of a machine tool. The measurement probe 10 has a deflectable stylus 14 with a workpiece-contacting tip 16. The measurement probe also includes a first frequency hopping radio communications module 18 that would typically be integrated within the body of the measurement probe but is shown separately in FIG. 1 for clarity. A measurement probe interface 20 is mounted on a stationary part 22 of the machine tool structure and is connected (typically via a cable) to the machine tool controller 24. The measurement probe interface 20 also includes a second frequency hopping radio communications module 26.

Data is transmitted between the measurement probe 10 and the probe interface 20 via a frequency hopping radio communications link that is established between the first frequency hopping radio communications module 18 and the second frequency hopping radio communications module 26. As noted above, the first and second frequency hopping radio communications modules need to hop between frequency channels in synchronisation in order to allow a communications link to be established. The sequence in which the various different frequency channels are used is typically termed the "hopping pattern". In a prior art system, the hopping pattern describes the order or sequence in which the different frequency channels will always be used (irrespective of the frame rate) and is used to ensure that, after appropriate synchronisation, both ends of the radio link are transmitting/receiving on the same frequency channel at the same point in time (assuming both ends use the same frame rate). In other words, the hopping pattern describes the sequence of "hopping" between the different frequency channels.

Additional details of the system, such as how communication timings are established to ensure synchronised frequency hopping and how the reliability of communications of measurement data from the measurement probe to the probe interface can be increased by allowing the retransmission of data, are therefore not explained in any detail in the present application for brevity. For further details of such features, reference is made to WO2004/057552, the contents of which are hereby incorporated herein by reference.

In a frequency hopping system, both ends of the link (probe and interface) need to maintain close synchronisation. As one frame rolls over to the next, both ends of the link will change to the next channel in the hopping sequence, regardless of whether a transmission is going to be made. This enables the two ends of the link to be ready to make and receive a data packet on the correct channel and at the correct time.

Figure 2:
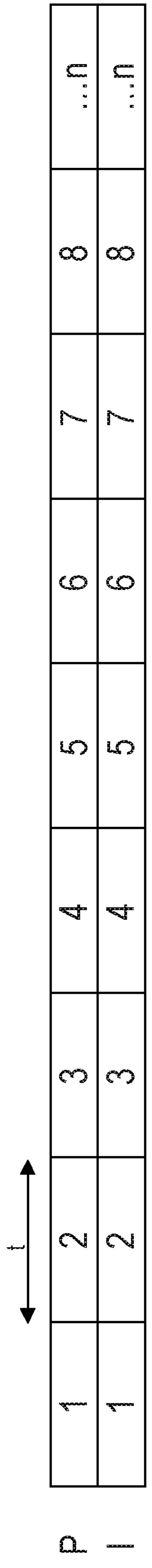
FIG. 2 shows synchronised probe and interface hopping.

FIG. 2 schematically illustrates the hopping sequences adopted by a frequency hopping system of the type described with reference to FIG. 1. The communication modules in the probe (labelled P) and interface (labelled I) cycle through the frequency channels together. Each channel is used for the frame time (t). There may not be exchanges of data during each frame and messages may be periodically exchanged to maintain synchronisation (i.e. to keep the frames temporally aligned).

To preserve battery life, the frame sizes can be reduced in length to only accommodate the data that is required for the type of measurement sensor that is being used. However, certain measurement device, such as the latest generation of so-called analogue probes, have more than one mode of operation. For example, an analogue probe may operate in a touch trigger mode (i.e. when it signals it is in proximity to a surface) or a scanning mode (i.e. where a stream of surface position measurements are generated). Such an analogue probe may also include a video sensor or an ultrasound (flaw) detector etc. An analogue probe of this type thus requires a larger communications bandwidth when taking an "analogue" measurement than is necessary for, say, touch trigger measurements.

There is thus a desire to operate with different frame times. For example, so that longer frames can be used to send the larger data payload. However, switching frame time (from shorter to longer and vice versa) requires co-ordination from both ends of the link, otherwise it is possible that the channel synchronisation is lost and communication between the two ends will fail.

Figure 3:
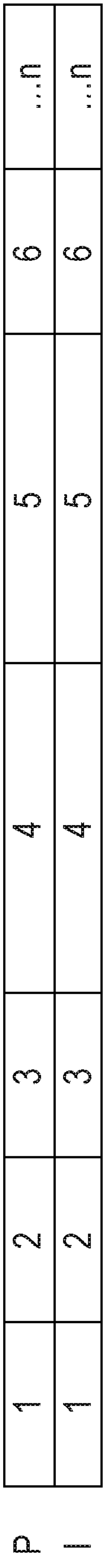
FIG. 3 shows synchronised hopping with frame rate changes.

Normal operating communications consist of a message being sent from the probe to the interface and then an acknowledgement being sent from the interface back to the probe. If the probe receives back an acknowledgement, then it can be assumed that the original (probe to interface) message got through. As shown in FIG. 3, such a message sent from one end of the communications link could be used to tell the other end of the link to alter the frame time. This, however, has a low resilience to transmission errors.

As explained above, if the probe transmits, the interface receives, the interface transmits an acknowledgement, and the probe receives that acknowledgement then all is good. However, consider what happens if the probe transmits, the interface receives, the interface transmits but the probe does not receive. Under this circumstance, the probe will transmit again, but the interface does not know the probe didn't receive the message. Providing the interface receives the next transmission from the probe, the data can be resent from the interface. However, if the interface does not receive the next transmission from the probe, it would assume that its previous acknowledgement had in fact got through. Had this message contained an instruction to change frame rate or channel number, then synchronisation could be lost.

This is also illustrated in FIG. 4. If only, say, the probe changes frame rate, then there is one further frame where communication is possible between the probe and interface (indicated by the arrow) but after that the probe and interface cycle through the hopping pattern at different rates and hopping synchronisation is lost.

FIG. 5 illustrates how, in accordance with the present invention, it is possible to maintain frequency hopping synchronisation during frame rate changes with resilience to the non-receipt of transmissions. A clock signal is used to generate timing intervals of 0.25 ms and each frequency channel in the hopping pattern is allocated to each timing interval in turn. The base timing intervals and the associated frequency channels are labelled HP in the figures. It should be noted that the hopping pattern is repeated.

In a first mode, a frame time of 0.25 ms is used by both the probe (P) and the interface (I). Such a frame time is used for standby communications; e.g. it is a low power consumption mode that is used for housekeeping communications that allow timing corrections or operational data to be passed between the different ends of the link.

In a second mode, a frame time of 0.5 ms is used by both the probe and the interface. This may be used for touch trigger communications or for communicating measurements that comprise a relatively small amount of data. In this second mode, every other frequency channel in the hopping pattern is skipped (noting that the skipped channels will be used in the next repetition of the hopping pattern if there are an odd number of frequency channels overall). In other word, each frame uses the frequency channel allocated to the time interval that coincides with the start of the relevant frame. In the example of FIG. 5, it can be seen that the frequency channel 3 is used for the first 0.5 ms frame.

Referring to FIG. 6, the various advantages of using the frequency channel allocated to the base timing intervals are demonstrated. In particular, it can be seen that even if just one end of the link (i.e. the interface in this example) changes to a 0.5 ms frame time there will still be time periods in which both ends of the link operate on the same frequency channel (as indicated by the arrows). This allows any instruction to change frame time to be resent multiple times and hopping synchronisation can thus be maintained.

In a preferred embodiment, three different frame times are used. These are the 0.25 ms (Standby) communications and 0.5 ms frame time modes mentioned above. A 1.0 ms duration frame is also provided for large "bulk transfer" communications, such as the transmission of scanning or image data. The ratio of these frame times are 1:2:4. This allows for the three operating frames to use either a single hop, a double hop or a quadruple hop respectively between the frequency channel of the hopping pattern. Using this method, even if a communication is missed when performing a change of frame rate and the probe changes to a new rate without the interface also doing so, they will still maintain channel synchronisation. An important requirement for this embodiment is that when switching to a lower frame rate the interface also transmits "phase" information to the probe to ensure that the start of the new slower frame will occur on the same edge of the frame clock.

FIG. 7 illustrates how, even when using the three different frame times, frequency hopping synchronisation can be maintained. The probe is shown operating with 0.25 ms frames for 10 base time intervals (i.e. 2.5 ms) before it changes to 0.5 ms frames. The interface operates with 0.25 ms frame for two base time intervals, then 0.5 ms frames for 6 base time intervals before operating with 1 ms frames. In each case, the frequency channel used by the probe and the interface for each of their frames is the frequency channel allocated to the base timing interval at the start of that frame. Despite the different frame times, the same frequency channel is used for at least part of each longer frame allowing communications between the probe and interface which can be used to ensure both switch to using the same frame time.

Referring next to FIGS. 8 to 11, a more detailed illustration of the transition between different frames times is illustrated.

FIG. 8 shows a frame clock and the status of various lines in the probe and interface when operating with a frame time of 0.25 ms and being instructed to transition to a 0.5 ms frame time. A command 80 is applied to a status line to request a change from standby mode (i.e. 250 μs frame time) to operating mode (i.e. 500 μs frame time). The instruction to change mode is propagated up the chain to the modem, as labelled by 82 and 86. When the interface FPGA receives the request 84 to change to operating mode, it will switch to a 500 μs frame time by only synchronising on the rising edges of the clock frame.

The next time the probe communicates (labelled 88), the so-called RMI-QE interface will respond with the request to switch to operating mode. The modem in the RMI-QE will set the frame offset bit according to the frame clock edge for the current frame. If the current frame is driven from the rising edge (clock is high) the offset bit will be 0. If the frame is driven from the falling edge (clock is low) then the offset will be 1. In this way, the modem in the probe can ensure that its frame timer is re-initialised to use the correct edge. The exact delay required will depend on the amount of time required to initialise all the required systems within the probe, however it should make a transmission as soon as it is able on the correct frame timing.

FIG. 9 illustrates operation in the operating mode with a 500 μs frame time.

FIG. 10 shows a frame clock and the status of various lines in the probe and interface when operating with a frame time of 0.5 ms (operating mode) and being instructed to transition to a 1 ms frame time (bulk transfer mode).

As illustrated (see label 90 in FIG. 10) when scan enable goes high, the FPGA will notify the ARM core by raising the data ready line. Following the communication transaction, the ARM core will request a change to the frame time. The frame rate change request is transmitted to the FPGA in the RMI-QE interface on the next available communications slot (see label 92). Having received the frame rate change request (label 94) the RMI-QE interface will request a frame rate change from the modem during the next SPI communication slot. Having received a frame change request, the modem switches to the 1 ms frame time and does not respond to communications from the probe unless they occur on the rising edge of the frame clock (label 96). For 1 ms frames, a rising edge of both clocks denotes the start of frame.

FIG. 11 illustrates operation in the operating mode with a 1000 μs frame time. As labelled 100, having not received a response in the previous transmission the probe will retransmit in its next 500 μs frame, this will now coincide with a start of a frame. The interface will respond to the probe with the request to change the frame rate. Having received the change request, the probe will switch to sending the 1 ms bulk data frame type 102.

Although the above examples relate to measurement probes and probe interfaces, the same frequency hopping radio communications module could be used in other measurement devices. Similarly, operation in the 2.4 GHz radio band is provided merely as an example and is not intended to restrict the scope of the present invention. It should also be noted that the frequency hopping radio communications modules of the measurement probe and probe interface should share the same hopping pattern but there is no need for such modules to be completely identical in all aspects. For example, one or all modules may include features as described in WO2004/057552.

The invention claimed is:

1. A measurement device, comprising:

a measurement sensor for generating metrology data; and a frequency hopping radio communications module for transmitting and receiving a radio signal over a plurality of frequency channels, the frequency hopping radio communications module comprising a clock for defining a series of a base time interval, and a memory for storing a hopping pattern describing a sequence of the frequency channels, wherein the communications module is operable in at least a first mode, a second mode and a third mode, operation in the first mode comprises transmitting and/or receiving data using a series of first frames having a first frame time, the first frame time being equal to or a first integer multiple of the base time interval, operation in the second mode comprises transmitting and/or receiving data using a series of second frames having a second frame time, the second frame time being a second integer multiple of the first frame time, operation in the third mode comprises transmitting and/or receiving data using a series of third frames having a third frame time, the third frame time being a third integer multiple of the second frame time, the second and third integer multiples are other than one, and each successive base time interval of the series of the base time interval is associated with a successive frequency channel of the hopping pattern sequence, each frame of the first frames, the second frames, and the third frames using only the frequency channel associated with the base time interval that occurs at a start of that frame.

2. The measurement device according to claim 1, wherein the first frame time is equal to the base time interval.

3. The measurement device according to claim 1, wherein the second frame time is equal to M times the base time interval, where M=2N and Nis an integer of one or more.

4. The measurement device according to claim 1, wherein the second frame time is twice the base time interval.

5. The measurement device according to claim 1, wherein the third frame time is quadruple the base time interval.

6. The measurement device according to claim 1, wherein the base time interval is at least 0.25 ms.

7. The measurement device according to claim 1, wherein the first mode is used for standby communications of non-metrology data.

8. The measurement device according to claim 1, wherein the second mode is used for the communication of touch trigger data.

9. The measurement device according to claim 1, wherein the third mode is used for the communication of analogue probe data.

10. The measurement device according to claim 1, wherein the measurement sensor comprises at least one of a touch trigger sensor, a scanning sensor, an ultrasound sensor and an imaging sensor.

11. A measurement interface for communicating with the measurement device according to claim 1, the measurement interface comprising an output for passing measurement data received from the measurement device to an associated machine tool.

12. The measurement interface according to claim 11, comprising a frequency hopping radio communications module for transmitting and receiving a radio signal over a plurality of frequency channels, the frequency hopping radio communications module comprising a clock for defining a series of a base time interval, and a memory for storing a hopping pattern describing a sequence of the frequency channels, wherein the communications module of the measurement interface is operable in at least a first mode, a second mode and a third mode, operation in the first mode comprises transmitting and/or receiving data using a series of first frames having a first frame time, the first frame time being equal to or a first integer multiple of the base time interval, operation in the second mode comprises transmitting and/or receiving data using a series of second frames having a second frame time, the second frame time being a second integer multiple of the first frame time, operation in the third mode comprises transmitting and/or receiving data using a series of third frames having a third frame time, the third frame time being a third integer multiple of the second frame time, the second and third integer multiples are other than one, and each successive base time interval of the series of the base time interval is associated with a successive frequency channel of the hopping pattern sequence, each frame of the first frames, the second frames, and the third frames using only the frequency channel associated with the base time interval that occurs at a start of that frame.

13. The measurement interface according to claim 12, comprising an input for receiving an instruction to change between the first, second and third modes, the frequency hopping radio communications module of the measurement interface being configured to send a message to change mode to the frequency hopping radio communications module of the measurement device over a frequency hopping communications link.

14. The measurement interface according to claim 13, wherein the message to change mode includes timing information for synchronising the series of the base timing interval of the frequency hopping radio communications module of the measurement device with that of the frequency hopping radio communications module of the measurement interface.

15. A measurement system comprising one or more of the measurement devices according to claim 1 and a measurement interface for communicating with the one or more measurement devices, the measurement interface comprising an output for passing measurement data received from the one or measurement devices to an associated machine tool.

* * * * *